US012496832B2

(12) United States Patent
Oki

(10) Patent No.: US 12,496,832 B2

(45) Date of Patent: Dec. 16, 2025

(54) SYSTEM, CASE, AND LIQUID CONTAINER

(71) Applicant: BROTHER KOGYO KABUSHIKI KAISHA, Nagoya (JP)

(72) Inventor: Satoru Oki, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 62 days.

(21) Appl. No.: 18/472,509

(22) Filed: Sep. 22, 2023

(65) Prior Publication Data

US 2024/0100845 A1 Mar. 28, 2024

(30) Foreign Application Priority Data

Sep. 28, 2022 (JP) ................................ 2022-154489

(51) Int. Cl.
*B41J 2/175* (2006.01)

(52) U.S. Cl.
CPC ......... *B41J 2/1752* (2013.01); *B41J 2/17553* (2013.01)

(58) Field of Classification Search
CPC .... B41J 2/175; B41J 2/17503; B41J 2/17506; B41J 2/17509; B41J 2/17513; B41J 2/1752; B41J 2/17523; B41J 2/1753
See application file for complete search history.

(56) References Cited

U.S. PATENT DOCUMENTS 7,114,801 B2 * 10/2006 Hall ...................... B41J 2/1752 347/92
2007/0229618 A1 10/2007 Sugahara
2013/0182050 A1 7/2013 Aoki et al.
2013/0182051 A1 7/2013 Aoki et al.
2013/0186513 A1 7/2013 Aoki et al.
2013/0187993 A1 7/2013 Aoki et al.
2013/0194357 A1 8/2013 Karasawa et al.
2019/0016146 A1 * 1/2019 Fukasawa ............. B41J 29/393

FOREIGN PATENT DOCUMENTS

JP 2007-268792 A 10/2007
JP 2010-671 A 1/2010
JP 2013-159025 A 8/2013

* cited by examiner

*Primary Examiner* — Anh T Vo

(74) *Attorney, Agent, or Firm* — Merchant & Gould P.C.

(57) ABSTRACT

A system, having a liquid container and a case, is provided. The case has a tubular body extending along a mounting/demounting direction and entering the liquid container through a supply port, a liquid receiver located below an end of the tubular body, and a movable member contacting and being moved by the liquid container moving along the mounting/demounting direction. The liquid receiver is movable between a first position, at which the liquid receiver is one of in contact with and in proximity to the end of the tubular body, and a second position, at which the liquid receiver is separated farther from the end of the tubular body than the first position. The movable member moves the liquid receiver from the first position to the second position by contacting and being moved by the liquid container moving in the mounting orientation.

11 Claims, 10 Drawing Sheets

SYSTEM, CASE, AND LIQUID CONTAINER

REFERENCE TO RELATED APPLICATIONS

This application claims priority from Japanese Patent Application No. 2022-154489 filed on Sep. 28, 2022. The entire content of the priority application is incorporated herein by reference.

BACKGROUND ART

A printer having an ink cartridge and a mountable compartment in which the ink cartridge is mountable is known. The ink cartridge may contain ink and may have an ink supplying portion connected with an ink supplying needle in the mountable compartment and a protrusive portion located below the ink supplying portion. The protrusive portion may protrude by a larger amount than the ink supplying portion from a sideward face of the ink cartridge in a mounting direction, which is a direction to mount the ink cartridge in the mountable compartment. In this arrangement, when the ink cartridge is demounted from the mountable compartment, the ink may drip down from a tip of the ink supplying portion, but the ink may be caught on an upper face of the protrusive portion.

DESCRIPTION

In the known printer mentioned above, when the ink cartridge is demounted from the mountable compartment, the protrusive portion may move to a position, at which the protrusive portion does not overlap a tip of the ink supplying needle, in a plan view. Therefore, when the ink drips down from the tip of the ink supplying needle, the protrusive portion may not catch the ink. As a result, the mountable compartment may be dirtied with the ink. When a new ink cartridge is mounted in the dirtied mountable compartment, the ink may stain the new ink cartridge.

The present disclosure is advantageous in that a system, a case, and a liquid container, in which the case is restrained from being dirtied with liquid dripping down from a tubular member of the case, are provided.

FIGS. 9A-9D are illustrative views of the ink cartridge 30 being mounted in the cartridge case 110 with a press-down member 151 moving the movable member 106.

Figure 10:
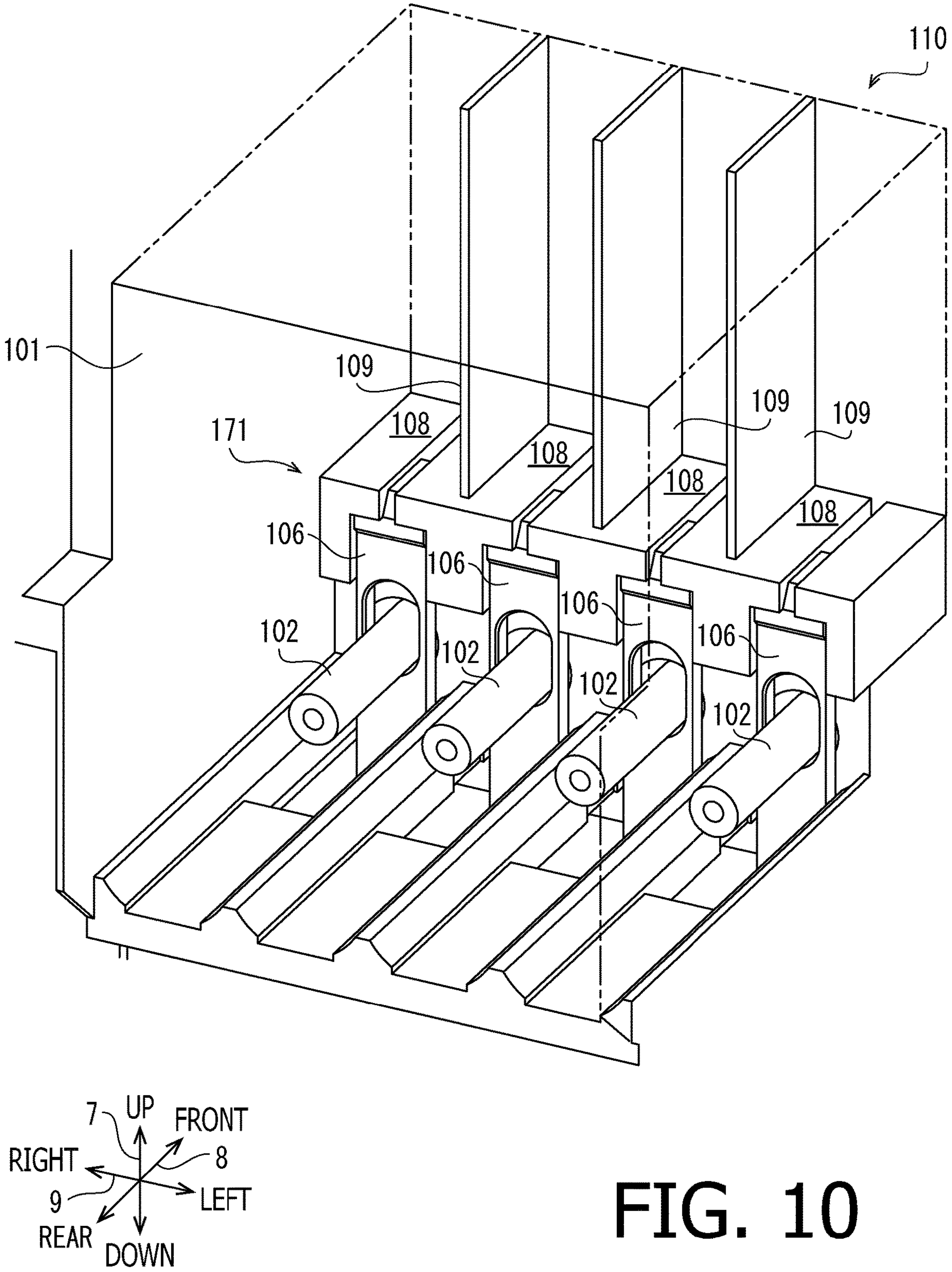

FIG. 10 is a perspective partial view of a cartridge case 110 with a plurality of movable members 106.

In the following paragraphs, embodiments of the present disclosure will be described with reference to the accompanying drawings. It is noted that a printer 10 described below is merely an exemplary embodiment of the present disclosure, and various connections may be set forth between elements in the following description. These connections in general and, unless specified otherwise, may be direct or indirect and that this specification is not intended to be limiting in this respect.

In the following paragraphs, an ink cartridge 30 is movable to be mounted in and demounted from a cartridge case 110 along a horizontal direction being a mounting/demounting direction, i.e., a direction intersecting orthogonally with the direction of gravity. Therefore, a front-rear direction 8 and a widthwise direction 9 may be understood as the horizontal direction, although the front-rear direction 8 may not necessarily be equal to the horizontal direction. Meanwhile, an upright direction intersecting orthogonally with the front-rear direction 8 may be defined as a vertical direction 7. Moreover, in the following paragraphs, a state where the ink cartridge 30 is mounted in the cartridge case 110 and usable, may be equal to a state, in which the ink cartridge 30 inserted in the cartridge case 110 is located at a mounted position. The mounted position is a position, at which an ink needle 102 being an example of a tubular body located in the cartridge case 110 is coupled with an outflow port 47 of the ink cartridge 30. In the following paragraphs, further, a mounted posture of the ink cartridge 30, in the state where the ink cartridge 30 is mounted in the cartridge case 110 and usable, may also be called a usable posture.

In the following paragraphs, furthermore, a term "frontward" may mean an orientation, in which the ink cartridge 30 is inserted into the cartridge case 110 along the front-rear direction 8, and the frontward orientation in the present embodiment is an example of mounting orientation. A term "rearward" may mean an orientation, in which the ink cartridge 30 is removed from the cartridge case 110 along the front-rear direction 8, and the rearward orientation in the present embodiment is an example of demounting orientation. An expression "face frontward" may mean facing or being oriented in an orientation, which includes a frontward component, and an expression "face rearward" may mean facing in an orientation, which includes a rearward component. An expression "face downward" may mean facing in an orientation, which includes a downward component, and an expression "face upward" may mean facing in a direction, which includes an upward component. For example, a phrase "a front face faces frontward" may mean not only that the front face faces frontward but also that the front face faces toward a side in a direction slanting with resect the frontward direction.

<Overall Configuration of Printer 10>

Figure 1:
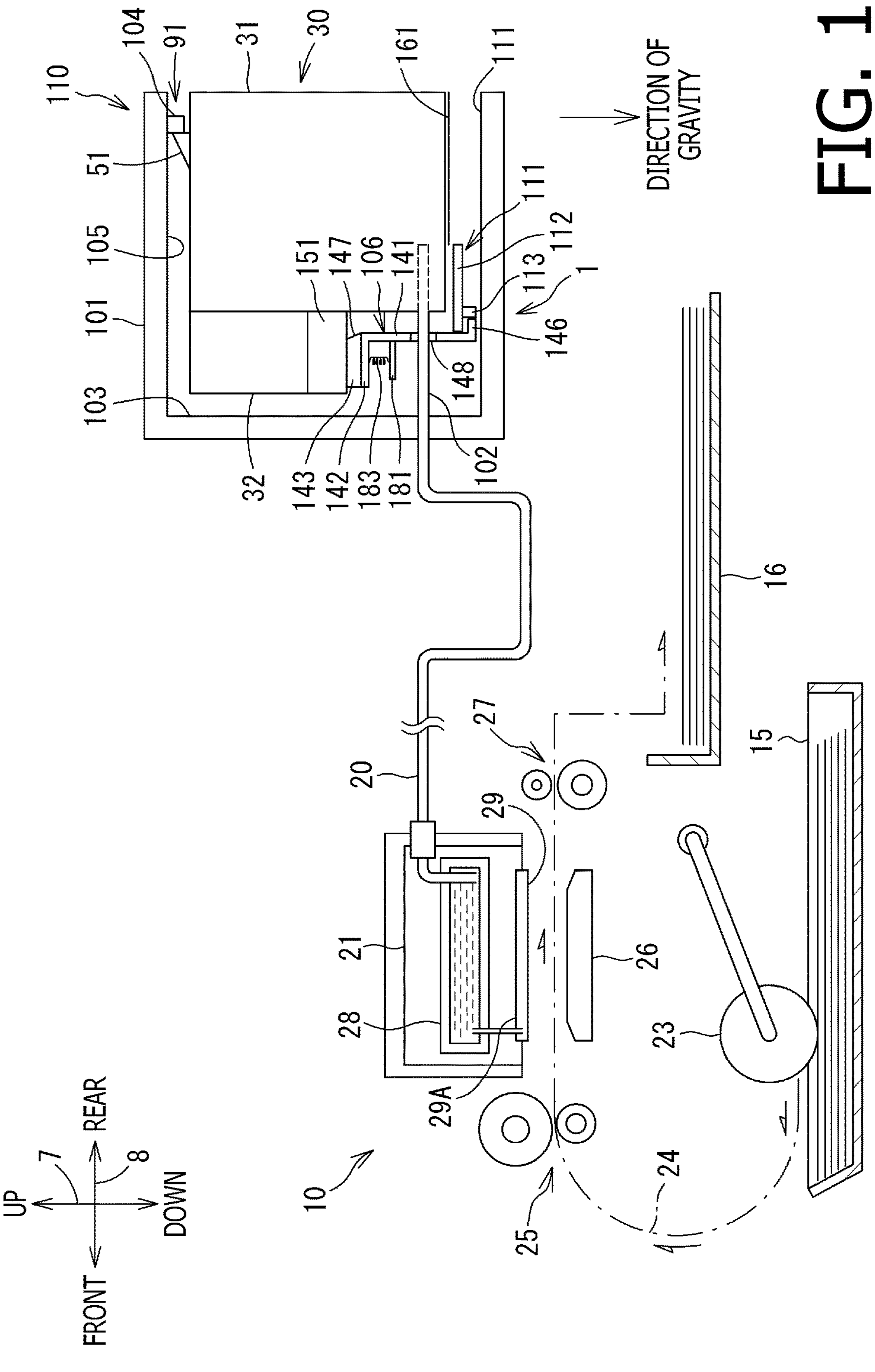
FIG. 1 is a schematic cross-sectional view of an internal structure of a printer 10.

As shown in FIG. 1, the printer 10 is an image forming apparatus in an inkjet style, which may record images on a sheet by discharging ink droplets at the sheet, and may be, for example, an inkjet printer. The printer 10 has a system 1, which includes the cartridge case 110 being an example of case and the ink cartridge 30 being an example of liquid container. The system 1 may include a plurality of ink cartridges 30 and the cartridge case 110, in which the plurality of ink cartridges 30 are mountable. The cartridge case 110 has an opening 91, which is formed on one side of the cartridge case 110. The ink cartridges 30 may be inserted frontward through the opening 91 into the cartridge case 110 and pulled rearward through the opening 91 to be removed from the cartridge case 110. FIG. 1 shows one of the ink cartridges 30 completely mounted in the cartridge case 110. In other words, the ink cartridge 30 in FIG. 1 is in a mounted state. The posture of the ink cartridge 30 in the mounted state is the usable posture. In the following paragraphs, solely one of the ink cartridges 30 may be described representatively.

The ink cartridge 30 may store liquid. For example, the ink cartridge 30 may store ink to be used in the printer 10.

In the state where the ink cartridge 30 is completely mounted in the cartridge case 110, the ink cartridge 30 and a recording head 21 are connected through an ink tube 20. The recording head 21 may discharge the ink supplied from the ink cartridge 30 through a plurality of nozzles 29. In particular, driving voltages may be applied by a head-controlling board (not shown) in the recording head 21 selectively to a plurality of piezoelectric devices 29A, which are arranged in one-to-one correspondence with the plurality of nozzles 29. Thereby, the ink droplets may be discharged selectively through the nozzles 29. Thus, the recording head 21 may consume the ink contained in the ink cartridge 30, which is mounted in the cartridge case 110.

The printer 10 has a feeder tray 15, a feeder roller 23, a conveyer roller pair 25, a platen 26, an ejection roller pair 27, and an ejection tray 16. The feeder roller 23 may feed a sheet on the feeder tray 15 to a conveyer path 24. The sheet fed to the conveyer path 24 may reach the conveyer roller pair 25. The conveyer roller pair 25 may convey the sheet reaching the conveyer roller pair 25 to an upper side of the platen 26. The recording head 21 may discharge the ink selectively at the sheet being conveyed to the platen 26. Thereby, an image may be recorded on the sheet. The sheet passing over the platen 26 may reach the ejection roller pair 27. The ejection roller pair 27 may eject the sheet reaching the ejection roller pair 27 at the ejection tray 16, which is located at a most downstream position in the conveyer path 24.

<Cartridge Case 110>

The cartridge case 110 has a case body 101, ink needles 102, first locking members 104, an ink receiver 111 being an example of liquid receiver, and a movable member 106, as shown in FIG. 1. The cartridge case 110 may accommodate the ink cartridges 30.

The case body 101 has a shape of a box that forms frames of the cartridge case 110. The opening 91 may optionally be exposable to a user-interface plane, which is a plane of the printer 10 a user may face when using the printer 10.

Figure 2:
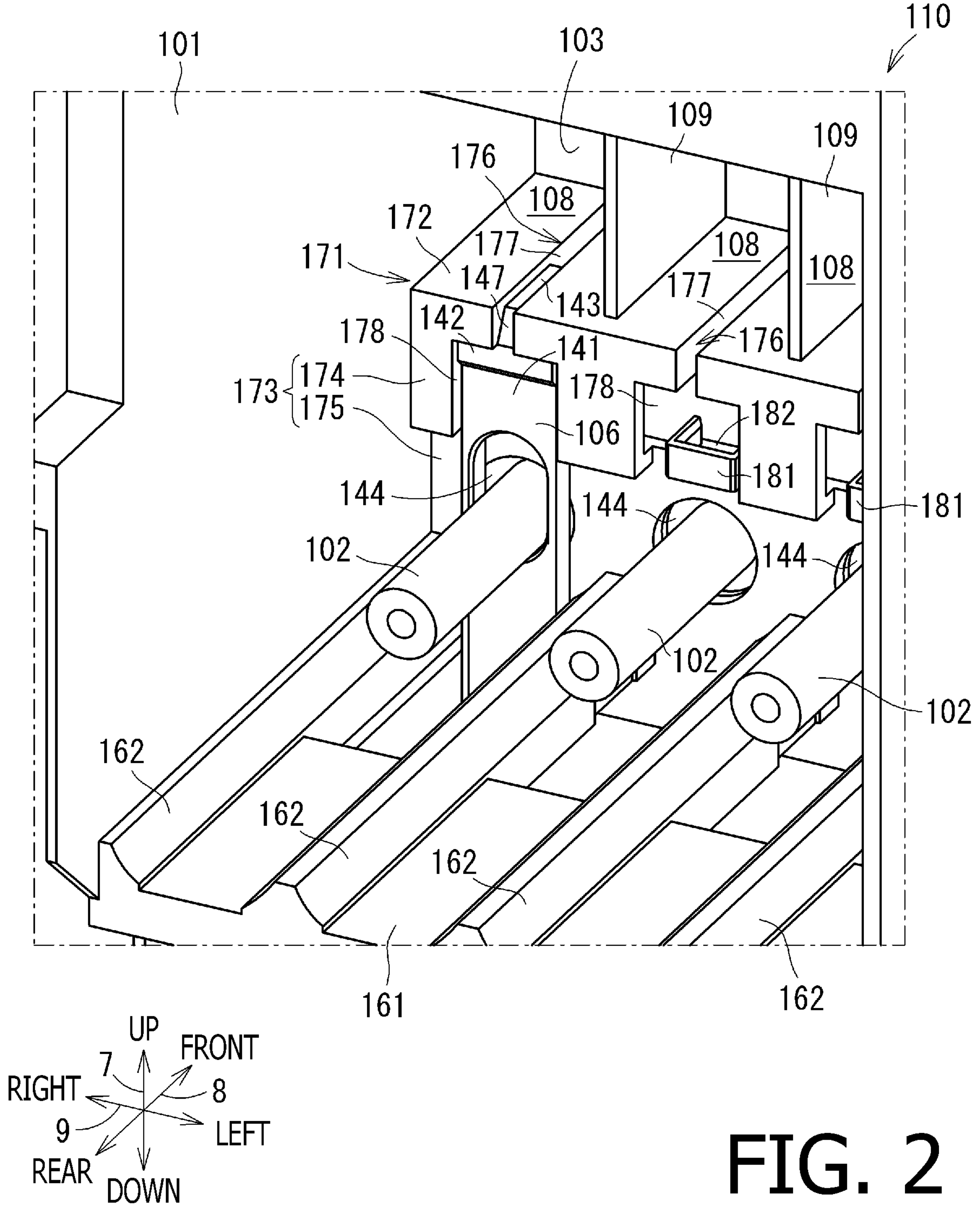
FIG. 2 is a perspective partial view of a cartridge case 110 with a movable member 106.
Figure 3:
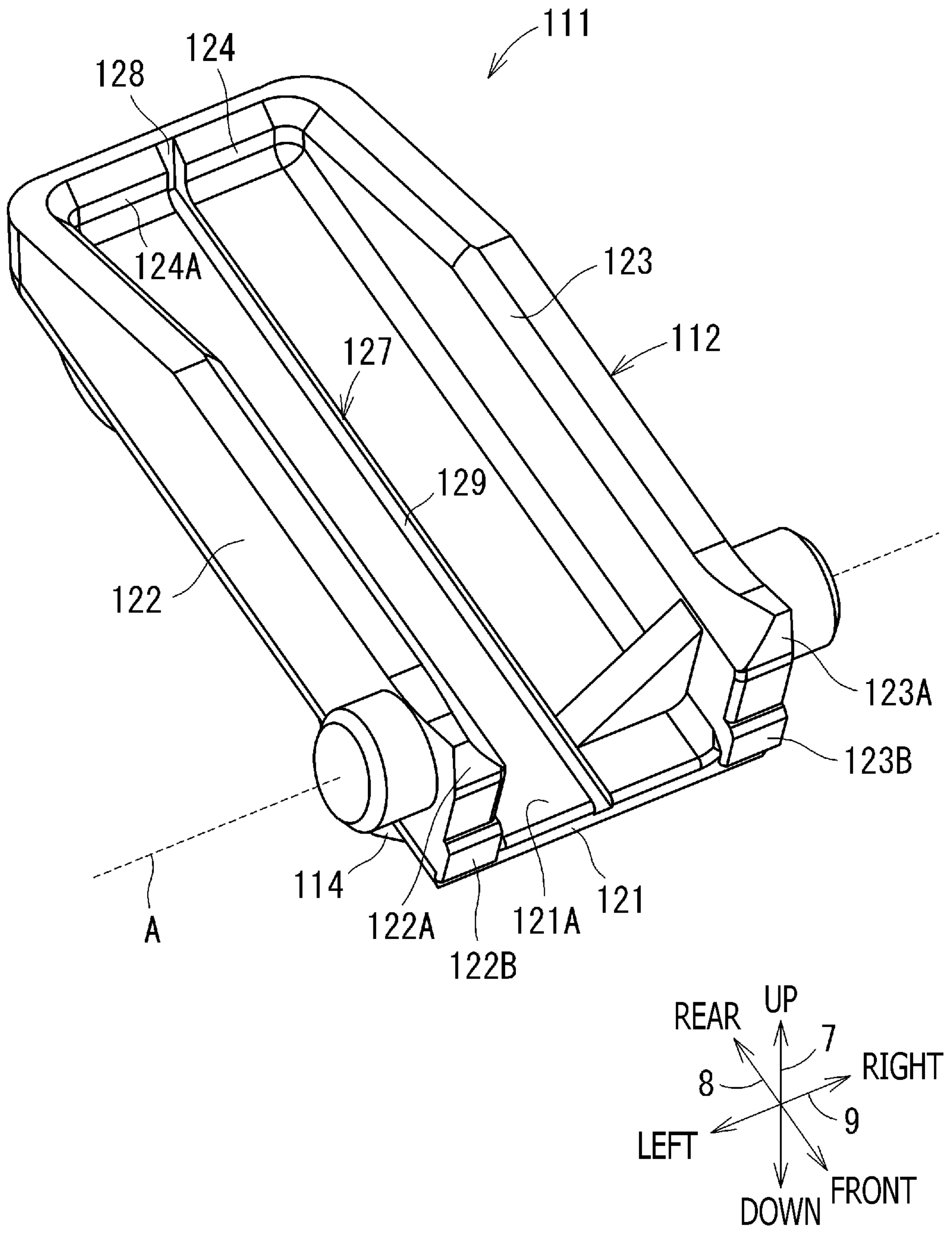
FIG. 3 is a perspective view of an ink receiver 111.

As shown in FIG. 2, the case body 101 has a plurality of slots 108 aligning in the widthwise direction 9. While FIG. 2 shows three (3) slots 108, the case body 101 in practice has four (4) slots 108. In other words, one of the four slots 108 is not shown in FIG. 2. The slots 108 are formed of a covering wall 171, a plurality of partition walls 109, and the case body 101.

The covering wall 171 is located at a lower position on an end face 103 of the case body 101. The covering wall 171 includes an upper wall 172 extending rearward from the end face 103 of the case body 101 and a rear wall 173 extending downward from a rearward end of the upper wall 172. The upper wall 172 has a form of a plate spreading in the front-rear direction 8 and the widthwise direction 9. The upper wall 172 ranges from a left-side wall to a right-side wall of the case body 101. The rear wall 173 has an upper-rearward wall 174, which extends downward from the rearward end of the upper wall 172, and a lower-rearward wall 175, which extends frontward from a lower end of the upper-rearward wall 174 and bends downward. The upper-rearward wall 174 has a form of a plate spreading in the vertical direction 7 and the widthwise direction 9. The upper-rearward wall 174 ranges from the left-side wall to the right-side wall of the case body 101. The lower-rearward wall 175 has a form of a plate, which spreading in the front-rear direction 8 and the widthwise direction 9, bent into an L shape. The lower-rearward wall 175 ranges from the left-side wall to the right-side wall of the case body 101. Four (4) through holes 144 are formed through the lower-rearward wall 175 in the front-rear direction 8. The through holes 144 are equally spaced from one another in the widthwise direction 9. In each of the through holes 144, each of the ink needles 102 is inserted.

The plurality of partition walls 109 extend upward from an upper face of the upper wall 172. The partition walls 109 are located to be equally spaced from one another. Each of the partition walls 109 has a form of a plate spreading in the vertical direction 7 and the front-rear direction 8. Each partition wall 109 ranges from a front end of the upper wall 172 to a position in vicinity of a rear end of the upper wall 172. In the slots 108, covers 32 of ink cartridges 30 storing inks in colors of black, cyan, magenta, and yellow may be removably inserted. In other words, the slots 108 and the ink cartridges 30 containing the inks in different colors are in one-to-one correspondence. The covers 32 of the ink cartridges 30 will be described later.

In the covering wall 171, slits 176 are located at positions in one-to-one correspondence to the slots 108. Each of the slits 176 is located at a center in the widthwise direction 9 of the corresponding one of the slots 108. Each slit 176 has a smaller slit 177 located in the upper wall 172 and a larger slit 178 located in the upper-rearward wall 174. The smaller slit 177 is formed through the upper wall 172 in the vertical direction 7. The smaller slit 177 extends along the front-rear direction 8. The smaller slit 177 ranges from the front end to the rear end of the upper wall 172. The smaller slit 177 is open rearward at the rear end of the upper wall 172. The larger slit 178 is formed through the upper-rearward wall 174 in the front-rear direction 8. The larger slit 178 extends along the vertical direction 7. The larger slit 178 ranges from an upper end and a lower end of the upper-rearward wall 174. The larger slit 178 is continuous with the smaller slit 177 at the upper end of the upper wall 172. The larger slit 178 is open downward at the lower end of the upper-rearward wall 174. A dimension of the larger slit 178 in the widthwise direction 9 is larger than a dimension of the smaller slit 177 in the widthwise direction 9.

In the case body 101, at a position lower than the through holes 144, a supporting board 161 is formed. The supporting board 161 has a form of a plate spreading in the front-rear direction 8 and the widthwise direction 9. The supporting board 161 ranges from the left-side wall to the right-side wall of the case body 101. The supporting board 161 supports the ink cartridges 30 from below when the ink cartridges 30 are mounted in the cartridge case 110. On an upper face of the supporting board 161, a plurality of rails 162 are provided. The rails 162 extend along the front-rear direction 8. Each rail 162 ranges from a rear end of the supporting board 161 to a rearward face of the lower-rearward wall 175. The rails 162 adjoining in the widthwise direction 9 may regulate a position of the ink cartridge 30 in the widthwise direction 9 when the ink cartridge 30 is being mounted in the cartridge case 110.

In an upper-end area on the lower-rearward wall 175, spring-supporting portions 181 are provided. The spring-supporting portions 181 are located frontward with respect to the larger slits 178. Each spring-supporting portion 181 has a supporting face 182 spreading in the front-rear direction 8 and the widthwise direction 9.

As shown in FIGS. 1 and 2, each ink needle 102 is in a tubular form and is located at a lower position in the end face 103 of the case body 101. The ink needle 102 is located at a position lower than the slot 108. The ink needle 102 is located at a position corresponding to the outflow port 47 of the ink cartridge 30 mounted in the cartridge case 110. The ink needle 102 protrudes from the end face 103 of the case body 101 along the front-rear direction 8, and a tip 102A of the ink needle 102 is open rearward. A form of the tip 102A of the ink needle 102 may be either plane or pointy.

The first locking members 104 protrude downward from a ceiling 105 of the case body 101. The first locking members 104 are located at positions in a rearward-end area on the ceiling 105 of the cartridge case 110.

As shown in FIGS. 1 and 3-5, the ink receiver 111 is located at a position lower than the ink needles 102. The ink receiver 111 has an ink-receivable portion 112 and a contact portion 113. The ink-receivable portion 112 has a form of a container or a tray, which is open upward and frontward. The ink-receivable portion 112 has a bottom base 121, a left-side wall 122, a right-side wall 123, and a rear wall 124. The bottom base 121 has a form of a plate spreading in the front-rear direction 8 and the widthwise direction 9. The bottom base 121 is longer in the front-rear direction 8 than in the widthwise direction 9. The bottom base 121 is located at a position in the widthwise direction 9 to coincide with a center of the ink needle 102 in the widthwise direction 9.

The left-side wall 122 extends upward from a leftward end of the bottom base 121. The left-side wall 122 has a form of a plate spreading in the vertical direction 7 and the front-rear direction 8. The left-side wall 122 ranges from a rear end to a front end of the bottom base 121. A frontward part of an upper face of the left-side wall 122 extends in parallel with the upper face 121A of the bottom base 121. A rearward part of the upper face of the left-side wall 122 slants to be lower rearward so that a height of the left-side wall 122 from the upper face 121A of the bottom base 121 decreases toward a rear end thereof. A front end of the left-side wall 122 has a first contact face 122A and a second contact face 122B. The first contact face 122A is located to be higher than the second contact face 122B. The first contact face 122A is located on an upper side of the front end of the left-side wall 122. The first contact face 122A faces obliquely upper-frontward in a state where the upper face 121A of the bottom base 121 lies horizontally (see FIG. 5). The second contact face 122B is located on a lower side of the front end of the left-side wall 122. The second contact face 122B faces frontward in the state where the upper face 121A of the bottom base 121 lies horizontally. In other words, the second contact face 122B spreads orthogonally to the upper face 121A of the bottom base 121.

The right-side wall 123 extends upward from a rightward end of the bottom base 121. The right-side wall 123 has a form of a plate spreading in the vertical direction 7 and the front-rear direction 8. The right-side wall 123 ranges from the rear end to the front end of the bottom base 121. A frontward part of an upper face of the right-side wall 123 spreads in parallel with the upper face 121A of the bottom base 121. A rearward part of the upper face of the right-side wall 123 slants to be lower rearward so that a height of the right-side wall 123 from the upper face 121A of the bottom base 121 decreases toward a rear end thereof. The right-side wall 123 faces the left-side wall 122 along the widthwise direction 9. A front end of the right-side wall 123 has a third contact face 123A and a fourth contact face 123B. The third contact face 123A is located to be higher than the fourth contact face 123B. The third contact face 123A is located on an upper side of the front end of the right-side wall 123. The third contact face 123A faces obliquely upper-frontward in the state where the upper face 121A of the bottom base 121 lies horizontally (see FIG. 5). The third contact face 123A spreads in parallel with the first contact face 122A. The fourth contact face 123B is located on a lower side of the front end of the right-side wall 123. The fourth contact face 123B faces frontward in the state where the upper face 121A of the bottom base 121 lies horizontally. In other words, the fourth contact face 123B spreads orthogonally to the upper face 121A of the bottom base 121.

The rear wall 124 extends upward from a rear end of the bottom base 121. The rear wall 124 has a form of a plate spreading in the vertical direction 7 and the widthwise direction 9. A frontward face 124A of the rear wall 124 slants with respect to the upper face 121A of the bottom base 121 by an obtuse angle θ (see FIG. 4). In other words, the frontward face 124A of the rear wall 124 faces obliquely upper-frontward in the state where the upper face 121A of the bottom base 121 lies horizontally. The rear wall 124 ranges from the rightward end to the leftward end of the bottom base 121. The rear wall 124 is connected to the rear ends of the left-side wall 122 and the right-side wall 123. The rear wall 124 is located at a position lower than a tip 102A of the ink needle 102. A guide groove 127 is located through the rear wall 124 and the bottom base 121.

The guide groove 127 is located at a center of the rear wall 124 and the bottom base 121 in the widthwise direction 9. The guide groove 127 has a rear groove 128 located in the rear wall 124 and a bottom groove 129 located in the bottom base 121. The rear groove 128 is recessed rearward from the frontward face 124A of the rear wall 124. The rear groove 128 extends from an upper end to a lower end of the rear wall 124 along the vertical direction 7. An upper end of the rear groove 128 is open at an upper face of the rear wall 124. Therefore, the ink may enter the rear groove 128 from an upper side easily. The bottom groove 129 is recessed downward from the upper face 121A of the bottom base 121. The bottom groove 129 extends from the rear end to the front end of the bottom base 121 along the front-rear direction 8. The bottom groove 129 is connected with the lower end of the rear groove 128 at the rear end of the bottom base 121. The front end of the bottom groove 129 is open frontward at a front face of the bottom base 121.

The contact portion 113 protrudes downward from a lower face of the bottom base 121. The contact portion 113 is located in a frontward area on the lower face of the bottom base 121. The contact portion 113 has a left-side contact portion 114 and a right-side contact portion 115 located apart in the widthwise direction 9 on the lower face of the bottom base 121. The left-side contact portion 114 is located on a leftward end on the lower face of the bottom base 121. The left-side contact portion 114 has a form of a plate spreading in the vertical direction 7 and the front-rear direction 8. The left-side contact portion 114 has a substantially trapezoidal form, of which lower base is smaller than an upper base thereof in a view along the widthwise direction 9. The left-side contact portion 114 has a fifth contact face 114A and a sixth contact face 114B. The fifth contact face 114A adjoins the lower face of the bottom base 121 on a frontward side of the left-side contact portion 114. The fifth contact face 114A faces slightly obliquely upper-frontward in the state where the upper face 121A of the bottom base 121 lies horizontally. The sixth contact face 114B adjoins the fifth contact face 114A at a lower end of the fifth contact face 114A. The sixth contact face 114B faces obliquely lower-frontward in the state where the upper face 121A of the bottom base 121 lies horizontally.

The right-side contact portion 115 is located on a rightward end on the lower face of the bottom base 121. The right-side contact portion 115 has the same form as the left-side contact portion 114. The right-side contact portion 115 has a form of a plate spreading in the vertical direction 7 and the front-rear direction 8. The right-side contact portion 115 has a substantially trapezoidal form, of which lower base is smaller than an upper base thereof in a view along the widthwise direction 9. The right-side contact portion 115 has a seventh contact face 115A and an eighth contact face 115B. The seventh contact face 115A adjoins the lower face of the bottom base 121 at a frontward side of the right-side contact portion 115. The seventh contact face 115A faces slightly obliquely upper-frontward in the state where the upper face 121A of the bottom base 121 lies horizontally. The seventh contact face 115A spreads in parallel to the fifth contact face 114A. The eighth contact face 115B adjoins the seventh contact face 115A at a lower end of the seventh contact face 115A. The eighth contact face 115B faces obliquely lower-frontward in the state where the upper face 121A of the bottom base 121 lies horizontally. The eighth contact face 115B spreads in parallel to the sixth contact face 114B.

The ink receiver 111 is pivotably supported by the case body 101 to pivot on an axis A, which extends along the widthwise direction 9. The axis A is located in an end area in the ink receiver 111 (see FIGS. 4 and 5). The ink receiver 111 is pivotable between a proximal position being an example of first position, at which the ink receiver 111 is in proximity to the tip 102A of the ink needle 102 (see FIG. 4), and a retracted position being an example of second position, at which the ink receiver 111 is separated farther from the ink needle 102 than the proximal position (see FIG. 5).

The proximal position is a position, at which the rear wall 124 of the ink receiver 111 is located to be closer to a lower side of the tip 102A of the ink needle 102. The rear wall 124 of the ink receiver 111, when located at the proximal position, is located slightly rearward from an end face 99 of the ink needle 102 in the front-rear direction 8. Optionally, a rearward face of the rear wall 124 may be located at a position coincident with the end face 99 of the ink needle 102 in the front-rear direction 8 when the ink receiver 111 is at the proximal position. Optionally, the rearward face of the rear wall 124 may be located at a position slightly frontward from the end face 99 of the ink needle 102 in the front-rear direction 8 when the ink receiver 111 is at the proximal position. The upper face 121A of the bottom base 121 of the ink receiver 111 located at the proximal position slants to be lower frontward with respect to a horizontal plane. In other words, the upper face 121A of the bottom base 121 of the ink receiver 111 located at the proximal position faces obliquely upper-frontward. An angle between the upper face 121A of the bottom base 121 of the ink receiver 111 located at the proximal position and the horizontal plane may be, for example, 35 degrees. The upper face 121A of the bottom base 121 of the ink receiver 111 located at the proximal position is an example of receiver face.

The retracted position is a position, at which the upper face 121A of the bottom base 121 lies horizontally. Optionally, the retracted position may be a position, at which the upper face 121A of the bottom base 121 slants slightly to be lower frontward. In other words, in the ink receiver 111 located at the retracted position, the upper face 121A of the bottom base 121 may face slightly obliquely upper-frontward. In the case where the upper face 121A of the bottom base 121 faces slightly obliquely upper-frontward, an angle between the upper face 121A of the bottom base 121 of the ink receiver 111 located at the retracted position and the horizontal plane may be, for example, 5 degrees.

The movable member 106 as shown in FIGS. 2 and 4-6 may restrict a pivoting behavior of the ink receiver 111. The movable member 106 may solely be provided to correspond to one of the slots 108 located most leftward in FIG. 2, or optionally, a plurality of movable members 106 may be provided to the slots 108 in one-to-one correspondence (see FIG. 10). The movable member 106 is located frontward with respect to the ink receiver 111. The movable member 106 has a larger block 141 located in the larger slit 178 in the upper-rearward wall 174, a smaller block 143 located in the smaller slit 177 in the upper wall 172, and a contact block 146 contacting the ink receiver 111.

The larger block 141 is located between the ink receiver 111 and the lower-rearward wall 175 in the front-rear direction 8. The larger block 141 has a form of a plate spreading in the vertical direction 7 and the widthwise direction 9. The larger block 141 has a size that ranges from a position higher than the ink needle 102 to a position lower than the ink needle 102. A frontward face and a rearward face of the larger block 141 are in a rectangular form, which is larger in the vertical direction 7 than in the widthwise direction 9. An upper part of the larger block 141 is located in the larger slit 178. A dimension of the larger block 141 in the widthwise direction 9 is slightly smaller than a dimension of the larger slit 178 in the widthwise direction 9. Thereby, a position of the larger block 141 in the widthwise direction 9 is regulated. The frontward face of the larger block 141 may contact front ends of the left-side wall 122 and the right-side wall 123 of the ink receiver 111. The rearward face of the larger block 141 may contact a rearward face of the lower-rearward wall 175. Thereby, the larger block 141 may be located at a correct position in the front-rear direction 8. At a center of the larger block 141 in the widthwise direction 9, a through hole 148 is formed through in the front-rear direction 8. The through hole 148 is an elongated hole longer in the vertical direction 7 than in the widthwise direction 9. Dimensions of the through hole 148 in the vertical direction 7 and the widthwise direction 9 are larger than an outer diameter of the ink needle 102. In the through hole 148, the ink needle 102 is inserted.

The spring-supporting block 142 extends frontward from an upper end of the larger block 141. The spring-supporting block 142 has a form of a plate spreading in the front-rear direction 8 and the widthwise direction 9. A lower face of the spring-supporting block 142 faces an upper face of a spring-supporting portion 181 in the vertical direction (see FIG. 4). The spring-supporting block 142 is urged upward by a coil spring 183, which is supported by the supporting face 182 of the spring-supporting portion 181. Therefore, an upper face 142A of the spring-supporting block 142 is pressed against a lower face of the upper wall 172.

The smaller block 143 extends upward from the upper face 142A of the spring-supporting block 142. The smaller block 143 is located at a center of the upper face 142A of the spring-supporting block 142 in the widthwise direction 9. The smaller block 143 has a form of a plate spreading in the vertical direction 7 and the front-rear direction 8. The smaller block 143 ranges from a rear end to a front end of the upper face 142A of the spring-supporting block 142. A dimension of the smaller block 143 in the widthwise direction 9 is slightly smaller than a dimension of the smaller slit 177 in the widthwise direction 90. A rear end of the smaller block 143 forms a slant face 147, which faces obliquely upper-rearward.

The contact block 146 extends rearward from a lower end of the larger block 141. The contact block 146 has a form of a plate spreading in the front-rear direction 8 and the widthwise direction 9. The contact block 146 may contact the contact portion 113 in the ink receiver 111.

Figure 4:
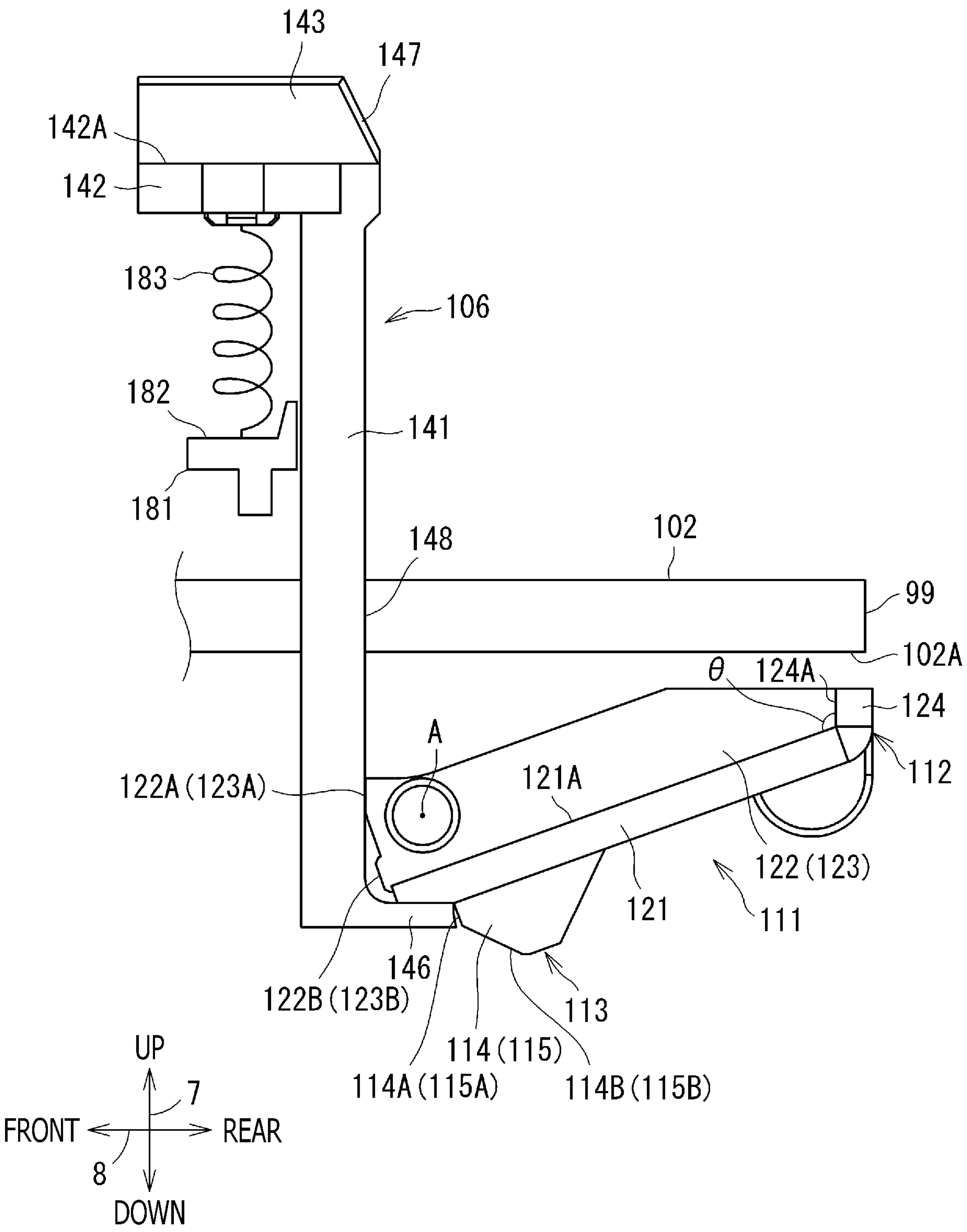
FIG. 4 is an illustrative view of the ink receiver 11 located at a proximal position.

The movable member 106 is movable along the vertical direction 7. In particular, the movable member 106 may move from an upper position, at which the upper face 142A of the spring-supporting block 142 is urged by the urging force of the coil spring 183 against the lower face of the upper wall 172, to a lower position, to which the movable member 106 is moved downward from the upper position against the urging force of the coil spring 183. At the upper position, as shown in FIG. 4, the first contact face 122A of the left-side wall 122 and the third contact face 123A of the right-side wall 123 in the ink receiver 111 may contact the rearward face of the larger block 141. Moreover, at the upper position, the fifth contact face 114A of the left-side contact portion 114 and the seventh contact face 115A of the right-side contact portion 115 may contact a rear end of the contact block 146. With the contacts, the pivoting behavior of the ink receiver 111 may be restricted.

Figure 5:
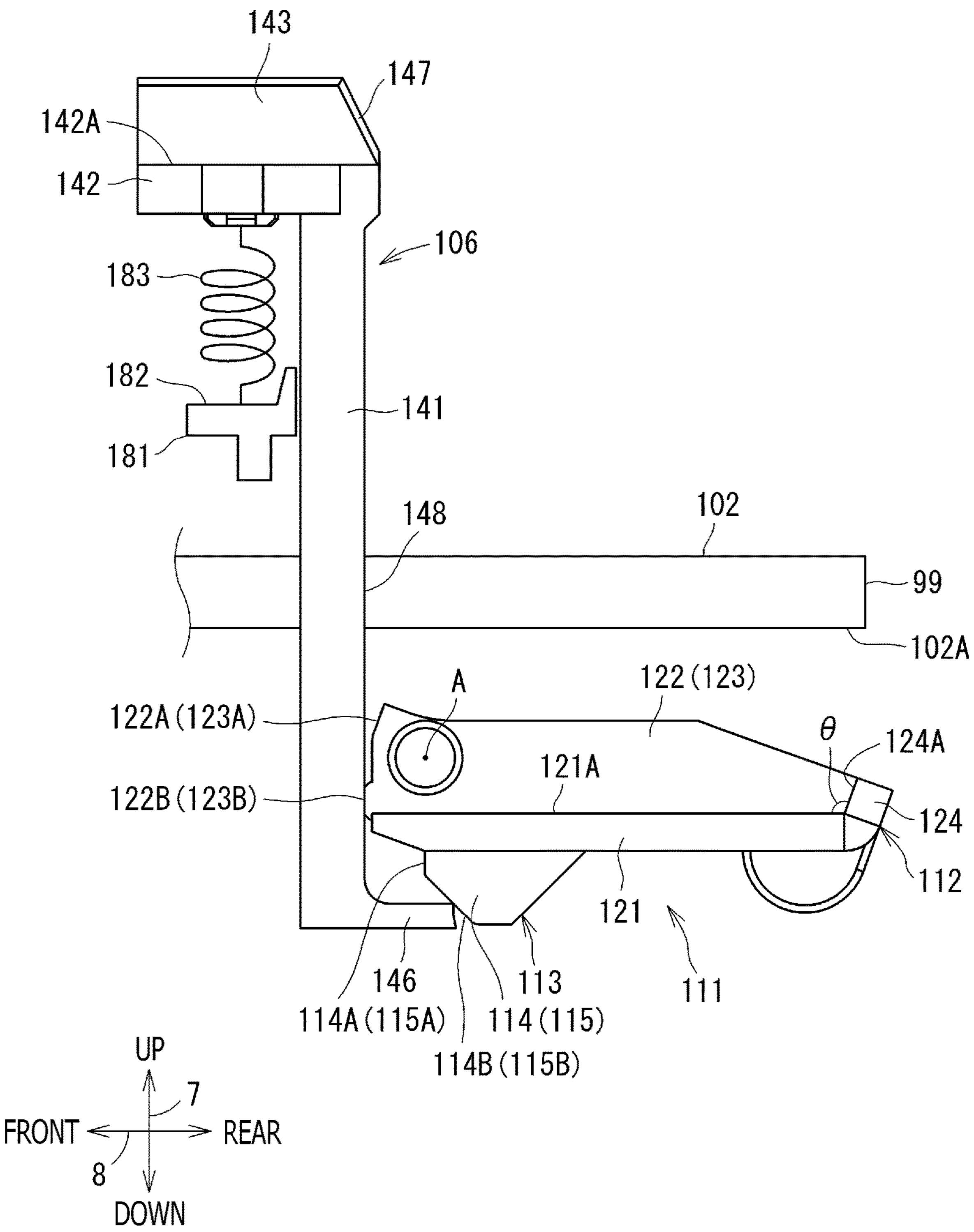
FIG. 5 is an illustrative view of the ink receiver 11 located at a retracted position.
Figure 6:
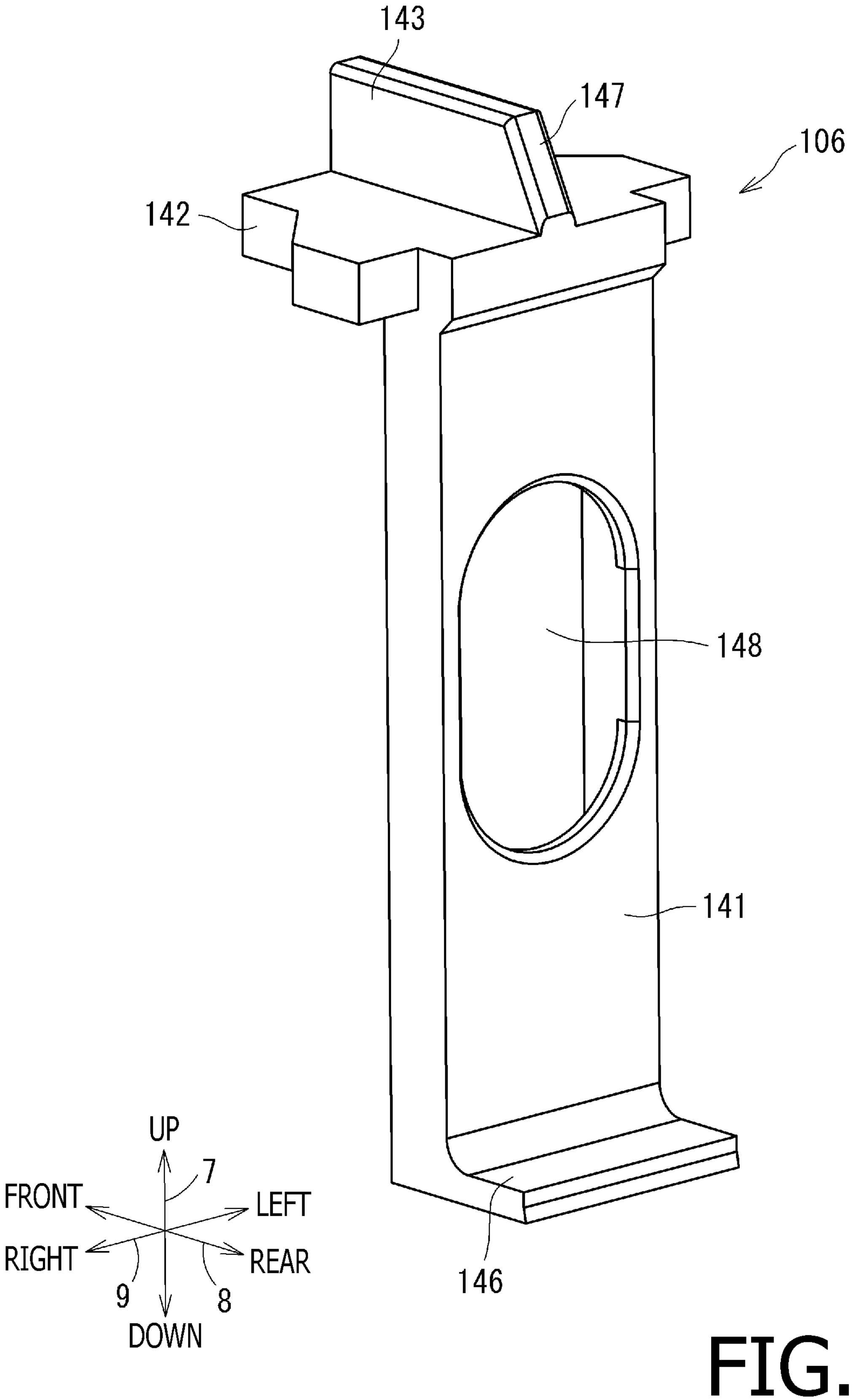
FIG. 6 is a perspective view of the movable member 106.

When the movable member 106 moves from the upper position toward the lower position, the rear end of the contact block 146 separates downward from the fifth contact face 114A and the seventh contact face 115A, and the ink receiver 111 pivots from the proximal position toward the retracted position by a weight thereof. At the lower position, as shown in FIG. 5, the second contact face 122B of the left-side wall 122 and the fourth contact face 123B of the right-side wall 123 in the ink receiver 111 may contact the rearward face of the larger block 141. Moreover, at the lower position, the sixth contact face 114B of the left-side contact portion 114 and the eighth contact face 115B of the right-side contact portion 115 may contact the rear end of the contact block 146 of the movable member 106. With the contacts, the pivoting behavior of the ink receiver 111 may be restricted.

<Ink Cartridge 30>

Figure 7:
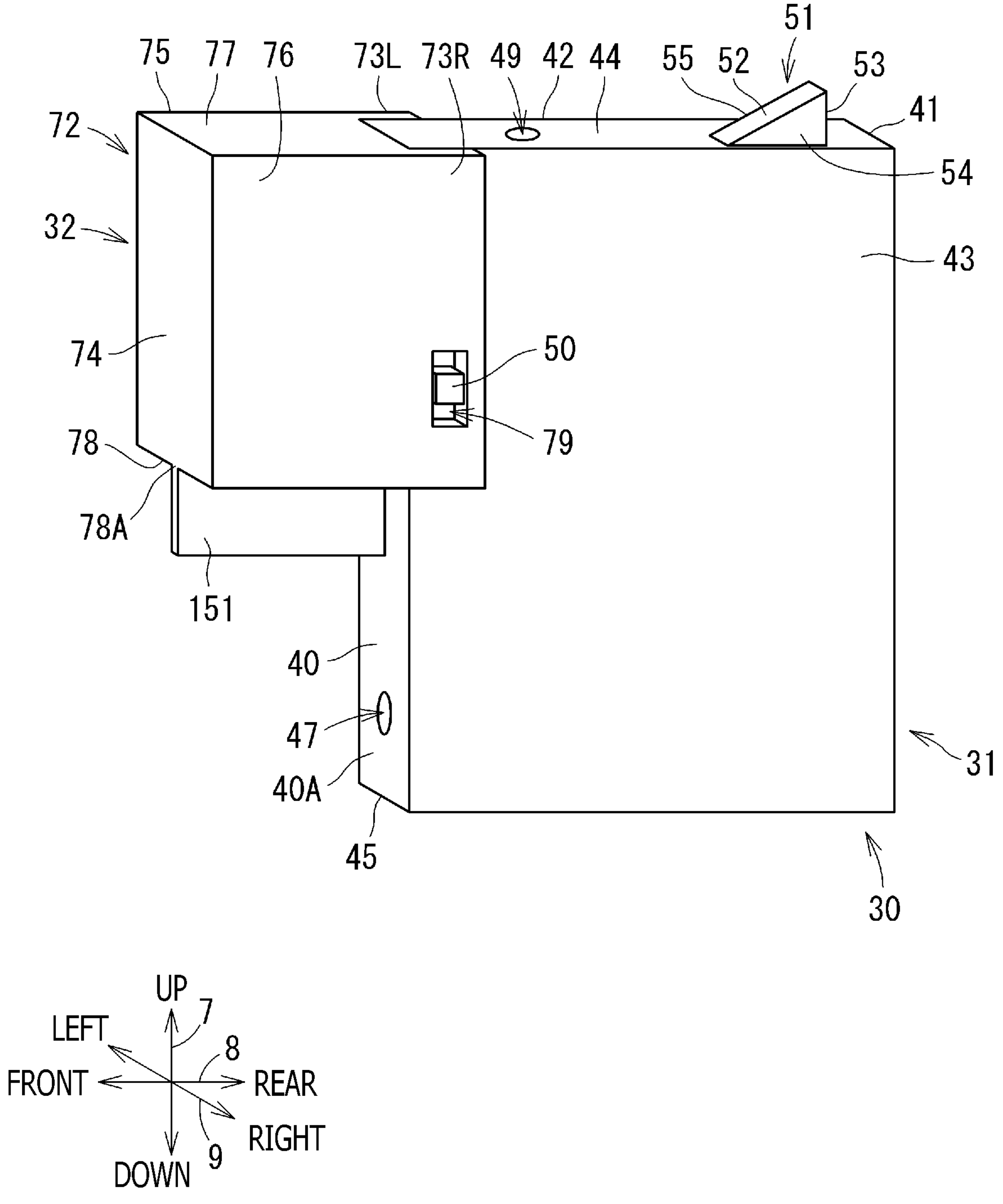
FIG. 7 is a perspective view of an ink cartridge 30.
Figure 8:
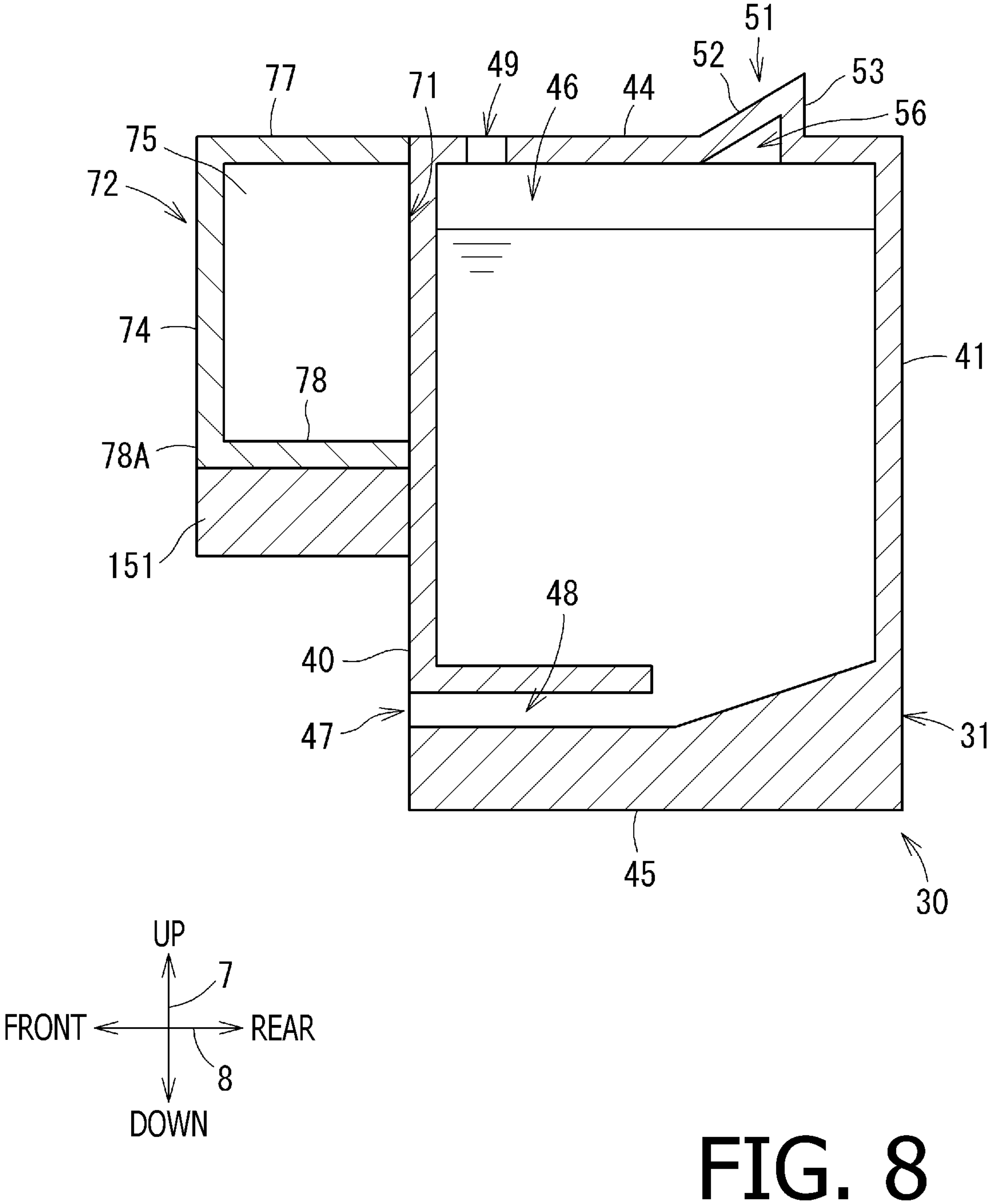
FIG. 8 is a cross-sectional view of the ink cartridge 30.

Each of the ink cartridges 30 is a container to store liquid, e.g., the ink. As shown in FIGS. 7 and 8, each ink cartridge 30 has a container body 31 and a cover 32.

The container body 31 has a form of a thin parallelepiped, of which dimension in the widthwise direction 9 is smaller than dimensions thereof in the vertical direction 7 and in the front-rear direction 8.

The container body 31 has a front wall 40, a rear wall 41 paired with the front wall 40 in the front-rear direction 8, a leftward wall 42 connecting the front wall 40 and the rear wall 41, a rightward wall 43 paired with the leftward wall 42 in the widthwise direction 9, an upper wall 44 connecting the front wall 40 and the rear wall 41, and a lower wall 45 paired with the upper wall 44 in the vertical direction 7. An outer face of the front wall 40 faces frontward. An outer face of the rear wall 41 faces rearward. An outer face of the leftward wall 42 faces leftward. An outer face of the rightward wall 43 faces rightward. An outer face of the upper wall 44 faces upward. An outer face of the lower wall 45 faces downward.

The front wall 40, the rear wall 41, the leftward wall 42, the rightward wall 43, the upper wall 44, and the lower wall 45 delimit a reservoir chamber 46 in a space inside the container body 31. The reservoir chamber 46 is located between the front wall 40 and the rear wall 41. The front wall 40, the rear wall 41, the leftward wall 42, the rightward wall 43, the upper wall 44, and the lower wall 45 are substantially translucent allowing the user to visually recognize a liquid surface of the ink contained in the reservoir chamber 46 from outside. The container body 31 may be formed integrally in, for example, synthetic resin.

At a lower position in the front wall 40, the outflow port 47 being an example of supply port, through which the ink may flow outward, is formed. The outflow port 47 is located at a widthwise center in the front wall 40. The outflow port 47 may be open externally, or, optionally, the outflow port 47 may be closable with, for example, a valve.

Inside the container body 31, an ink flow path 48 is formed to extend from the outflow port 47 along the front-rear direction 8. The ink flow path 48 connects the outflow port 47 and a lower end of the reservoir chamber 46. In other words, a frontward end of the ink flow path 48 forms the outflow port 47. The ink contained in the reservoir chamber 46 may flow outward through the ink flow path 48 and from the outflow port 47.

In the upper wall 44, an air release path 49, which connects an upper end of the reservoir chamber 46 and the outside of the reservoir chamber 46, is formed. Through the air release path 49, the air may be exchanged between the outside and the inside of the reservoir chamber 46. Through the air release path 49, air pressure of an air layer in the reservoir chamber 46 is equated with the atmospheric pressure. An opening of the air release path 49 on the outer face of the upper wall 44 is oriented upward. Optionally, the air release path 49 may be closable with, for example, a valve, a semi-translucent film, etc.

In a frontward end area on the rightward wall 43, a protrusive block 50 protrudes rightward from the outer face of the rightward wall 43. Although not shown in the drawings, a protrusive block 50 protrudes leftward from the outer face of the leftward wall 42 in a frontward end area on the leftward wall 42.

On the outer face of the upper wall 44, a locking portion 51 is located. The locking portion 51 is located rearward with respect to the air release path 49. The locking portion 51 protrudes upward from the outer face of the upper wall 44. The locking portion 51 has a slant face 52 facing upper-frontward, a locking face 53 facing rearward, a rightward face 54 facing rightward, and a leftward face 55 facing leftward. The slant face 52 and the locking face 53 are in rectangular forms. The rightward face 54 and the leftward face 55 are in a triangular form.

The locking portion 51 is formed integrally with the container body 31. Inner faces of the locking portion 51 delimit an inner space 56 inside the container body 31. The inner space 56 is a space open downward and is continuous with the reservoir chamber 46 at the downward end thereof. The inner space 56 is located at a position higher than the upper wall 44 in the mounted posture.

The locking portion 51 is located at a position corresponding to the first locking member 104 in the case body 101 in the widthwise direction 9. Therefore, when the ink cartridge 30 is inserted in the case body 101, the slant face 52 of the locking portion 51 may slide against the first locking member 104, and a rearward part of the ink cartridge 30 may shift downward as the ink cartridge 30 proceeds frontward. When the slant face 52 reaches a position frontward with respect to the first locking member 104, the rearward part of the ink cartridge 30 may shift upward. When a locking face 53 of the locking portion 51 and the first locking member 104 face each other in the front-rear direction 8, the locking face 53 may contact the first locking member 104. Thus, the locking portion 51 and the first locking member 104 are engaged, and the ink cartridge 30 may be maintained in the mounted state.

The cover 32 has a shape of a parallelepiped smaller than the container body 31 and has an opening 71 oriented rearward. The cover 32 is attached to the container body 31 to cover a part of the front wall 40 of the container body 31 higher than the outflow port 47.

The cover 32 has a covering body 72 and extended parts 73L, 73R. The covering body 72 is in a shape of a box having the opening 71 oriented rearward. The covering body 72 has a leftward wall 75 and a rightward wall 76 forming the opening 71. The extended parts 73L, 73R extend from a rear end of the leftward wall 75 and a rear end of the rightward wall 76, respectively.

The covering body 72 has a front wall 74, a leftward wall 75 extending rearward from a leftward end of the front wall 74, a rightward wall 76 paired with the leftward wall 75 in the widthwise direction 9, an upper wall 77 extending rearward from an upper end of the front wall 74, and a lower wall 78 pared with the upper wall 77 in the vertical direction 7. An outer face of the front wall 74 faces frontward. An outer face of the leftward wall 75 faces leftward. An outer face of the rightward wall 76 faces rightward. An outer face of the upper wall 77 faces upward. An outer face of the lower wall 78 faces downward. The front wall 74, the leftward wall 75, the upper wall 77, and the lower wall 78 delimit an inner space inside the covering body 72.

A press-down member 151 extends downward from a lower face of the lower wall 78. The press-down member 151 is located at a center of the lower face of the lower wall 78 in the widthwise direction 9. The press-down member 151 has a form of a plate spreading in the vertical direction 7 and the front-rear direction 8. The press-down member 151 is formed in a range from a front end 78A to a rear end of the lower face of the lower wall 78. Thus, the press-down member 151 is located at the front end 78A, which is a frontward end of the ink cartridge 30. A dimension of the press-down member 151 in the vertical direction 7 is smaller than a dimension of the press-down member 151 in the front-rear direction 8.

The covering body 72 is in a size that may be inserted in the slot 108 in the case body 101. A dimension of the covering body 72 along the vertical direction 7 is smaller than a dimension of the container body 31 along the vertical direction 7. A dimension of the covering body 72 along the front-rear direction 8 is smaller than a dimension of the container body 31 along the front-rear direction 8. A dimension of the covering body 72 along the widthwise direction 9 is substantially larger than a dimension of the container body 31 along the widthwise direction 9.

The extended part 73R extends rearward from the rear end of the rightward wall 76. The extended part 73R has a form of a plate. In a vertically central area in the extended part 73R, a through hole 79 is formed through in the widthwise direction 9. In the through hole 79, the protrusive block 50 is inserted. The through hole 79 has a rectangular form, of which dimensions are greater than external dimensions of the protrusive block 50. A dimension of the through hole 79 along the vertical direction 7 is greater than a dimension of the through hole 79 along the front-rear direction 8. The dimension of the through hole 79 in the vertical direction 7 is substantially greater than a dimension of the protrusive block 50 along the vertical direction 7. Therefore, the protrusive block 50 inserted in the through hole 79 is movable in the vertical direction 7. Although not shown in the drawings, the leftward wall 75 has a through hole 79, which is in the same form as the through hole 79 on the rightward wall 76.

The leftward wall 75 and the rightward wall 76 are paired in the widthwise direction 9. Between the leftward wall 75 and the rightward wall 76, the container body 31 is inserted. With the protrusive block 50 located on the leftward wall 75 of the container body 31 being inserted in the through hole 79 in the extended part 73L, and the protrusive block 50 located on the rightward wall 76 of the container body 31 being inserted in the through hole 79 in the extended part 73R, the cover 32 may be attached to the container body 31. The cover 32 is, in the state where the cover 32 is attached to the container body 31, movable in the vertical direction 7 with respect to the container body 31 within the range, in which the protrusive blocks 50 are movable in the vertical direction 7 in the through holes 79.

The cover 32, in the state where the cover 32 is attached to the container body 31, covers a part of the front wall 40, including an upper part of the front wall 40, of the container body 31. The outer face of the front wall 74 of the cover 32 is located frontward with respect to the outflow port 47. The outflow port 47 is located at a position lower than a lower end of the opening 71 in the cover 32.

Next, a procedure to mount the ink cartridge 30 in the cartridge case 110 will be described with reference to FIGS. 9A-9D. Initially, the ink receiver 111 is located at the proximal position as shown in FIG. 9A.

Figure 9A:
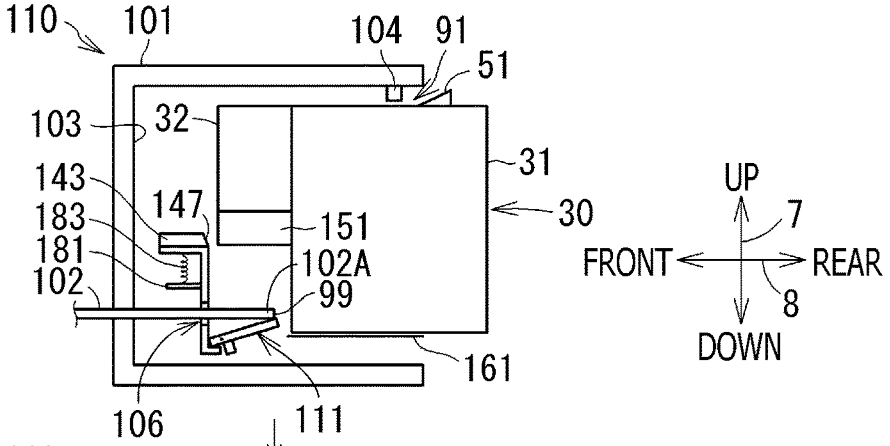
Figure 9B:
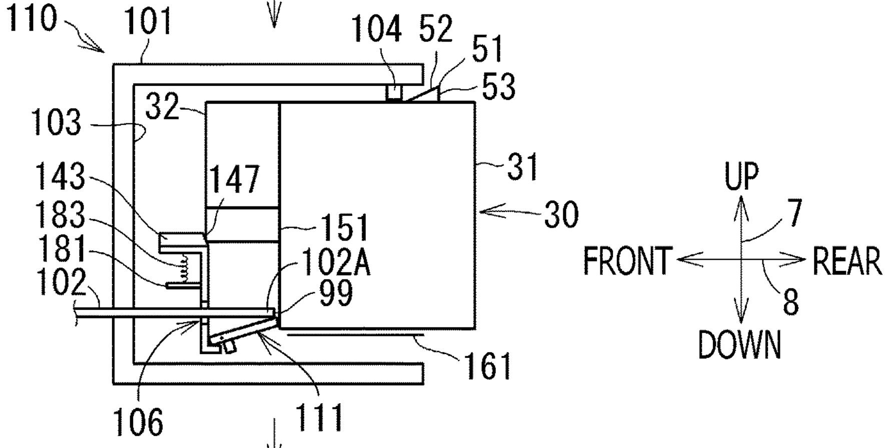

First, as shown in FIG. 9A, a user may insert the ink cartridge 30 frontward, toward the most leftward one of the slots 108 shown in FIG. 2, through the opening 91 of the cartridge case 110. Thereby, the ink cartridge 30 may be guided frontward on the supporting board 161 and the rails 162 in the cartridge case 110, and a front end of the press-down member 151 may enter the smaller slit 177 in the upper wall 172. Accordingly, as shown in FIG. 9B, the front end of the press-down member 151 may contact the slant face 147 of the smaller block 143. In this arrangement, the outflow port 47 in the ink cartridge 30 is located rearward from the tip 102A of the ink needle 102. In other words, the ink needle 102 is not yet inserted in the outflow port 47. As the user moves the ink cartridge 30 further frontward, the slant face 147 of the smaller block 143 may be pushed downward by the press-down member 151. Therefore, the movable member 106 may move downward from the upper position to the lower position against the urging force of the coil spring 183. Accordingly, the rear end of the contact block 146 may separate downward from the fifth contact face 114A and the seventh contact face 115A of the contact portion 113, and the ink receiver 111 may pivot on the axis A from the proximal position toward the retracted position by gravity (see FIGS. 4 and 5).

Figure 9C:
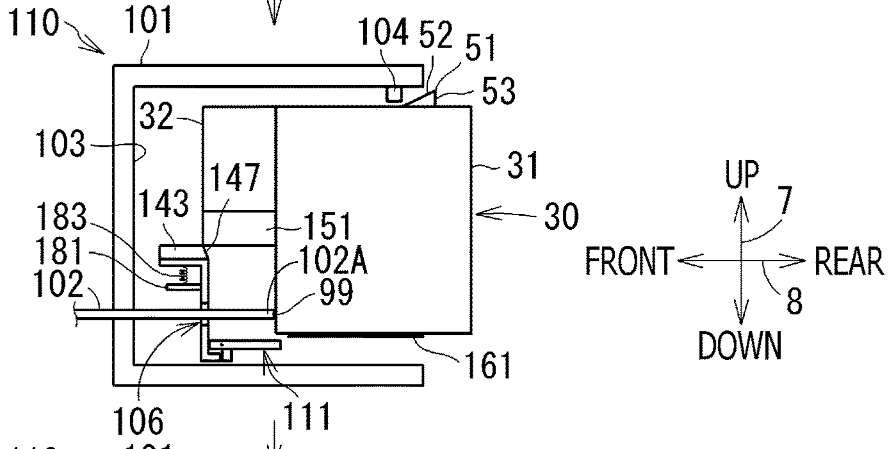
Figure 9D:
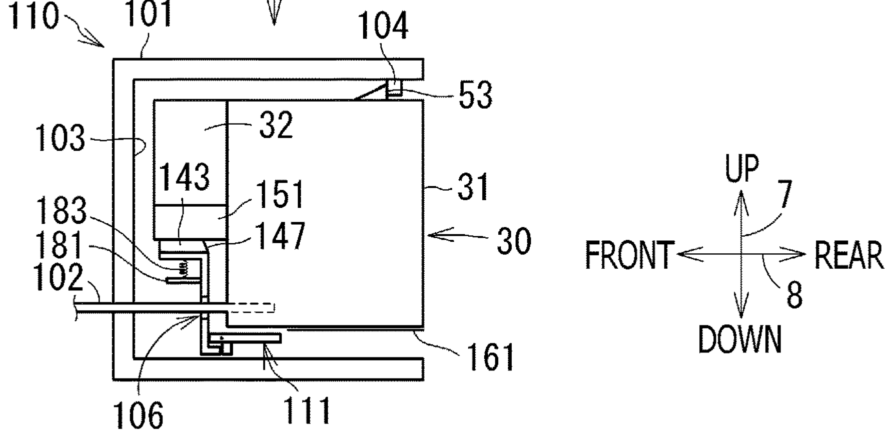

Moreover, when the movable member 106 reaches the lower position and the ink receiver 111 reaches the retracted position, as shown in FIG. 9C, a gap, in which the lower end of the ink cartridge 30 is movable in the front-rear direction 8, is created between the ink needle 102 and the ink receiver 111. In this arrangement, the end face 99 of the ink needle 102 is in proximity to the outflow port 47 in the ink cartridge 30. With the end face 99 of the ink needle 102 located in proximity to the outflow port 47, the user may move the ink cartridge 30 further frontward, and the ink needle 102 may be inserted in the outflow port 47 in the ink cartridge 30. Moreover, as the slant face 52 of the locking portion 51 in the ink cartridge 30 contacts the first locking member 104, the ink cartridge 30 may turn about the outflow port 47 with the ink needle 102 inserted therein, with the rearward part of the ink cartridge 30 shifting downward, and the locking portion 51 may move frontward with respect to the first locking member 104. Thereafter, the ink cartridge 30 may turn back about the outflow port 47, with the rearward part thereof shifting upward. Thereby, the locking face 53 may contact the first locking member 104. As a result, as shown in FIG. 9D, the ink cartridge 30 may be mounted in the cartridge case 110.

Next, a procedure to demount the ink cartridge 30 from the cartridge case 110 will be described.

First, the user may move the rearward part of the ink cartridge 30 downward to locate the locking portion 51 to a position lower than the first locking member 104. Next, the user may move the ink cartridge 30 rearward. As the press-down member 151 of the ink cartridge 30 separates from the smaller block 143 of the movable member 106, the movable member 106 may move from the lower position to the upper position due to the urging force of the coil spring 183. As the movable member 106 moves, the ink receiver 111 may pivot from the retracted position to the proximal position. In the meantime, the ink may drip down from the tip of the ink needle 102. However, the ink may be received by the upper face 121A of the bottom base 121 of the ink receiver 111 located at the proximal position. The ink received by the ink receiver 111 may flow obliquely lower-frontward along the upper face 121A or the guide groove 127 of the bottom base 121 and may be directed to a location, which may not be apparent to the user.

Occasionally, the ink may stay on the tip 102A of the ink needle 102 due to the surface tension effect; however, when the ink grows to a substantial size to contact the upper end of the rear groove 128 in the guide groove 127 in the ink receiver 111, the ink may be drawn to the rear groove 128 by capillary force. As a result, the ink may flow obliquely lower-frontward along the upper face 121A or the guide groove 127 of the bottom base 121 and may be directed to a location, which may not be apparent to the user.

BENEFITS

According to the printer 10, when the user moves the ink cartridge 30 frontward into the cartridge case 110, the ink receiver 111 may move from the proximal position to the retracted position. Therefore, the outflow port 47 of the ink cartridge 30 may be connected to the ink needle 102 without causing the ink cartridge 30 to contact the ink receiver 111. While the outflow port 47 of the ink cartridge 30 is not connected to the ink needle 102, the ink receiver 111 is located at the proximal position. Therefore, if the ink drips down from the tip 102A of the ink needle 102 when the ink cartridge 30 is being demounted from the cartridge case 110, the ink may be received by the ink receiver 111. Therefore, the ink may be restrained from falling in the cartridge case 110, and the ink cartridge 30 being mounted in the cartridge case 110 may be restrained from touching the ink.

According to the printer 10, the upper face 121A of the bottom base 121 in the ink receiver 111 located at the proximal position slants lower-frontward with respect to the horizontal plane. Therefore, the ink received by the upper face 121A of the bottom base 121 may flow lower-frontward along the upper face 121A of the bottom base 121 to the location that may not be apparent to the user. Accordingly, the ink cartridge 30 being mounted in the cartridge case 110 may be restrained from touching the ink.

According to the printer 10, the ink receiver 111 has the guide groove 127, which dents downward from the upper face 121A of the bottom base 121 and extends frontward. Therefore, although the ink may stay on the tip 102A of the ink needle 102 due to the surface tension, when the ink grows to a substantial size to contact the upper end of the rear groove 128 in the guide groove 127 in the ink receiver 111, the ink may be drawn to the rear groove 128 by capillary force. As a result, the ink may be received by the ink receiver 111 easily.

According to the printer 10, by the movable member 106 moving downward, which is a direction intersecting with the front-rear direction 8, the ink receiver 111 may pivot from the proximal position to the retracted position. Therefore, the cartridge case 110 may be downsized in the front-rear direction 8 and the widthwise direction 9.

According to the printer 10, as the movable member 106 contacts the ink cartridge 30 moving frontward and moves downward, the ink receiver 111 may pivot from the proximal position to the retracted position by the weight thereof. Therefore, the user may easily cause the ink receiver 111 to pivot from the proximal position to the retracted position by moving the ink cartridge 30 frontward.

According to the printer 10, the press-down member 151 located at the front end 78A, which is a frontward end of the ink cartridge 30, may contact the smaller block 143 in the movable member 106. Therefore, the user mounting the ink cartridge 30 in the cartridge case 110 may cause the ink cartridge 30 to contact the movable member 106 before the outflow port 47 in the ink cartridge 30 contacts the ink needle 102. Therefore, the ink receiver 111 may be moved from the proximal position to the retracted position easily before the outflow port 47 in the ink cartridge 30 contacts the ink needle 102. Therefore, the user may connect the outflow port 47 to the ink needle 102 easily.

Modified Examples

While the invention has been described in conjunction with an example structure outlined above and illustrated in the figures, various alternatives, modifications, variations, improvements, and/or substantial equivalents, whether known or that may be presently unforeseen, may become apparent to those having at least ordinary skill in the art. Accordingly, the example embodiment of the disclosure, as set forth above, is intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

For example, as shown in FIG. 10, the cartridge case 110 may have a plurality of movable members 106 and a plurality of ink receivers 111 (see FIG. 3) provided in one-to-one correspondence to the slots 108. In this arrangement, the ink receivers 111 may move from the respective proximal position to the respective retracted position individually as the ink cartridges 30 are mounted in the cartridge case 110 individually, and each of the ink cartridges 30 may be restrained from contacting the ink on the corresponding ink receiver 111. When the ink cartridges 30 are demounted from the cartridge case 110 individually, the ink dripping down from the tips 102A of the ink needles 102 may be received by the ink receivers 111 securely. Therefore, the inks may be restrained from falling in the cartridge case 110, and the ink cartridges 30 being mounted in the cartridge case 110 may be maintained clean without contacting the inks more effectively.

For another example, in the state where the ink cartridge 30 is not mounted in the cartridge case 110, the ink receiver 111 may not necessarily be located at the proximal position, at which the ink needle 102 is in proximity to the tip 102A of the ink needle 102, but may be located at a contact position, at which the ink receiver 111 contacts the lower side of the tip 102A of the ink needle 102.

For another example, the upper face 121A of the bottom base 121 of the ink receiver 111 located at the proximal position may not necessarily slant to be lower frontward as long as the upper face 121A is capable of receiving the ink dripping from the tip 102A of the ink needle 102. For example, the upper face 121A of the bottom base 121 of the ink receiver 111 located at the proximal position may be parallel to the horizontal plane.

For another example, the ink receiver 111 may not pivot on the axis A to move from the proximal position to the retracted position as long as the gap, in which the lower end of the ink cartridge 30 is movable, is created between the ink receiver 111 in the retracted position and the ink needle 102. For example, the ink receiver 111 may move to the retracted position by moving downward from the proximal position.

For another example, the movable member 106 may not necessarily move the ink receiver 111 from the proximal position to the retracted position by moving downward when the movable member 106 contacts the ink cartridge 30 moving frontward as long as the movable member 106 is enabled to move the ink receiver 111 from the proximal position to the retracted position. For example, the movable member 106 may move the ink receiver 111 from the proximal position to the retracted position by moving upward when the movable member 106 contacts the ink cartridge 30 moving frontward. For another example, the movable member 106 may move the ink receiver 111 from the proximal position to the retracted position by moving in the front-rear direction 8 or the widthwise direction 9 when the movable member 106 contacts the ink cartridge 30 moving frontward.

For another example, the ink receiver 111 may not necessarily have the guide groove 127, but the guide groove 127 may be omitted.

For another example, the press-down member 151 may not necessarily be located at the front end 78A, which is the frontward end of the ink cartridge 30, as long as the press-down member 151 is enabled to contact the slant face 147 of the smaller block 143 in the movable member 106. For example, the press-down member 151 may be located rearward from the outflow port 47.

For another example, in the flow path between the ink cartridge 30 and the recording head 21, a sub tank to store the ink may be provided additionally to the ink tube 20. In the case where the sub tank is provided, the sub tank may be connected with the ink needle 102 and with the ink tube 20.

For another example, the liquid to be stored in the reservoir chamber 46 of the ink cartridge 30 may not necessarily be limited to ink. For example, cleansing liquid may be stored in the reservoir chamber 46 of the ink cartridge 30.

For another example, the printer 10 may not necessarily have the cartridge case 110 with the four slots 108, in which the covers 32 of the ink cartridges 30 storing the inks in the colors of black, cyan, magenta, and yellow may be inserted. For example, the printer 10 may have the cartridge case 110 with a slot 108, in which the cover 32 of the ink cartridge 30 storing the ink in a single color, e.g., black, may be inserted. In other words, the printer 10 may be a monochrome-only printer.

What is claimed is:

1. A system, comprising:

a liquid container having a reservoir chamber and a supply port, the supply port being open on a front face of the liquid container in a mounting orientation, the mounting orientation being an orientation to mount the liquid container into the system along a mounting/demounting direction, the reservoir chamber being configured to contain liquid to be supplied outward through the supply port; and a case having:

a tubular body extending along the mounting/demounting direction, the tubular body being configured to enter the liquid container through the supply port;

a liquid receiver located below an end of the tubular body oriented in a demounting orientation, the demounting orientation being an orientation opposite to the mounting orientation; and a movable member configured to contact and to be moved by the liquid container moving along the mounting/demounting direction, wherein the liquid receiver is movable between a first position, at which the liquid receiver is one of in contact with and in proximity to the end of the tubular body, and a second position, at which the liquid receiver is separated farther from the end of the tubular body than the first position, and wherein the movable member is configured to move the liquid receiver from the first position to the second position by contacting and being moved by the liquid container moving in the mounting orientation.

2. The system according to claim 1, wherein the liquid receiver has a receiver face, the receiver face slanting in the liquid receiver located at the first position with respect to a horizontal plane to be lower in the mounting orientation.

3. The system according to claim 2, wherein the liquid receiver has a guide groove, the guide groove being recessed downward from the receiver face and extending along the mounting orientation.

4. The system according to claim 1, wherein the movable member is configured to move the liquid receiver between the first position and the second position by moving in a vertical direction, the vertical direction intersecting with the mounting/demounting direction.

5. The system according to claim 4, wherein the movable member is configured to contact the liquid container moving in the mounting orientation and to be moved downward by the liquid container.

6. The system according to claim 1, wherein the liquid container is configured to contact the movable member at a frontward end thereof in the mounting orientation.

7. The system according to claim 1, further comprising a plurality of liquid containers, each of which is the liquid container having the reservoir chamber and the supply port, wherein the case has a plurality of tubular bodies, each of which is the tubular body, the plurality of tubular bodies being provided in one-to-one correspondence to the plurality of liquid containers;

a plurality of liquid receivers, each of which is the liquid receiver, the plurality of liquid receivers being provided in one-to-one correspondence to the plurality of liquid containers; and a plurality of movable members, each of which is the movable member, the plurality of movable members being provided in one-to-one correspondence to the plurality of liquid containers.

8. The system according to claim 1, wherein the liquid receiver is configured to move between the first position and the second position in a direction intersecting with the mounting/demounting direction of the movable member.

9. A case configured to mount a liquid container therein, the liquid container being configured to store liquid and being mountable in the case in a mounting orientation along a mounting/demounting direction, the case comprising:

a tubular body extending along the mounting/demounting direction, the tubular body being configured to enter the liquid container through a supply port in the liquid container, the supply port being open on a front face of the liquid container in the mounting orientation;

a liquid receiver located below an end of the tubular body oriented in a demounting orientation, the demounting orientation being an orientation opposite to the mounting orientation; and a movable member configured to contact and to be moved by the liquid container moving along the mounting/demounting direction, wherein the liquid receiver is movable between a first position, at which the liquid receiver is one of in contact with and in proximity to the end of the tubular body, and a second position, at which the liquid receiver is separated farther from the end of the tubular body than the first position, and wherein the movable member is configured to move the liquid receiver from the first position to the second position by contacting and being moved by the liquid container moving in the mounting orientation.

10. The case according to claim 9, wherein the case is configured mount a plurality of liquid containers therein, each of the plurality of liquid containers being the liquid container configured to store liquid, the case further comprising:

a plurality of tubular bodies, each of which is the tubular body, the plurality of tubular bodies being provided in one-to-one correspondence to the plurality of liquid containers;

a plurality of liquid receivers, each of which is the liquid receiver, the plurality of liquid receivers being provided in one-to-one correspondence to the plurality of liquid containers; and a plurality of movable members, each of which is the movable member, the plurality of movable members being provided in one-to-one correspondence to the plurality of liquid containers.

11. A liquid container configured to be mounted in a case in a mounting orientation along a mounting/demounting direction, the case comprising a tubular body extending along the mounting/demounting direction, the tubular body being configured to enter the liquid container through a supply port in the liquid container, the supply port being open on a front face of the liquid container in the mounting orientation, the tubular body having an end oriented in a demounting orientation, the demounting orientation being an orientation opposite to the mounting orientation; a liquid receiver located below the end of the tubular body, the liquid receiver being movable between a first position, at which the liquid receiver is one of in contact with and in proximity to the end of the tubular body, and a second position, at which the liquid receiver is separated farther from the end of the tubular body than the first position; and a movable member configured to move in a vertical direction, the vertical direction intersecting with the mounting/demounting direction, wherein the liquid container moving in the mounting orientation is configured to contact and move the movable member and thereby move the liquid receiver from the first position to the second position.

* * * * *